(No Model.)
M. H. W. HERMANN.
VALVE FOR CISTERNS, &c.
No. 552,998. Patented Jan. 14, 1896.
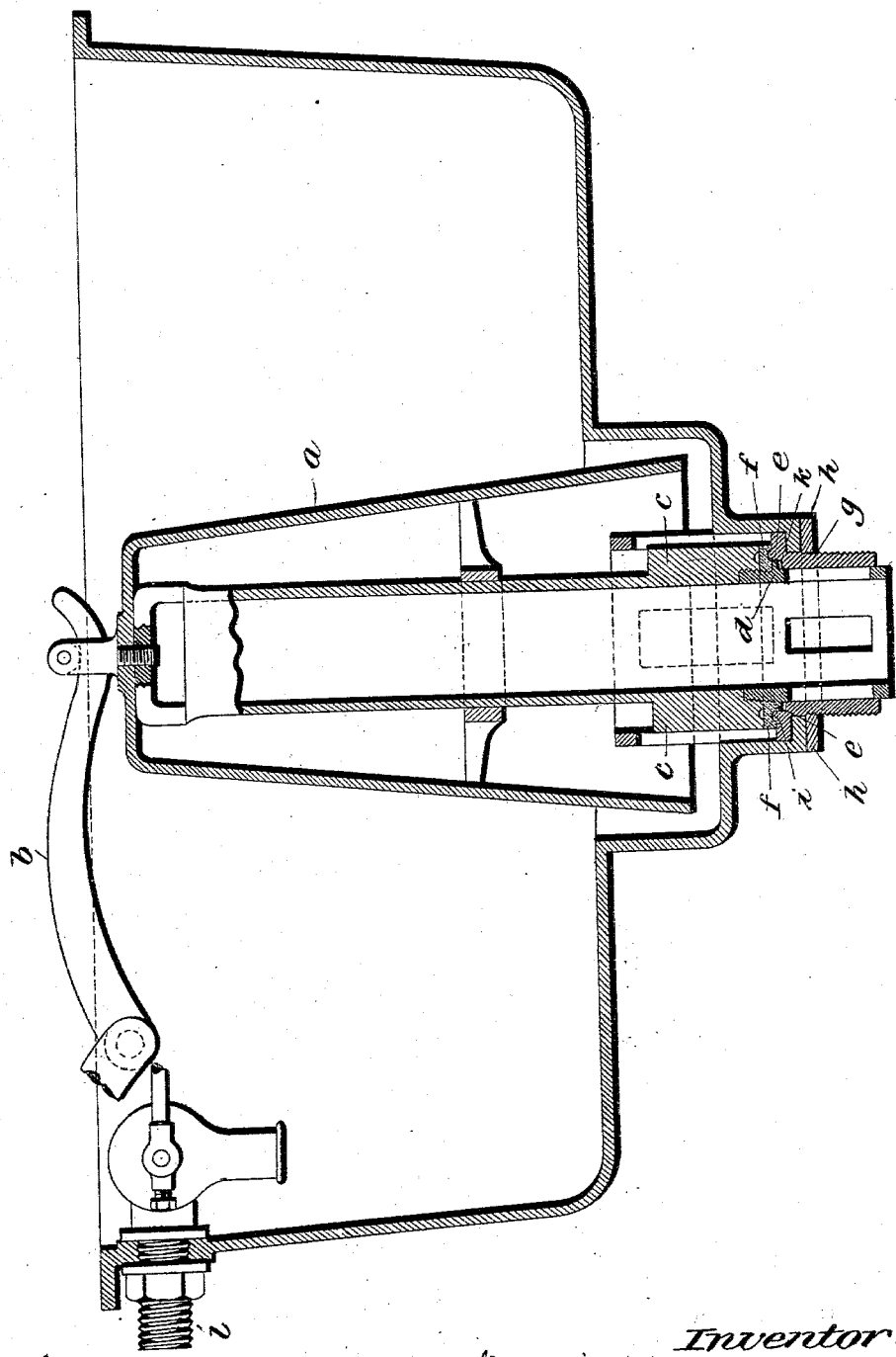
Witnesses:
L. C. Hills,
J. D. Kingsbery.
Inventor:
Martin H. W. Hermann
By Whitaker & Prevost, attys.
ANDREW B.GRAHAM. PHOTO-LITHO. WASHINGTON.D.C.

UNITED STATES PATENT OFFICE.

MARTIN HEINRICH WILHELM HERMANN, OF ALTONA, GERMANY.

VALVE FOR CISTERNS, &c.

SPECIFICATION forming part of Letters Patent No. 552,998, dated January 14, 1896.

Application filed March 21, 1895. Serial No. 542,706. (No model.)

*To all whom it may concern:*

Be it known that I, MARTIN HEINRICH WILHELM HERMANN, of Altona, in the German Empire, have invented an Improved Valve for Cisterns and Tanks Used for Flushing Purposes and the Like, of which the following is a specification, reference being had therein to the accompanying drawing.

The object of this invention is an improved valve for cisterns and tanks used for flushing purposes and the like, which differs from the valves hitherto used for this purpose by the body of the valve having a double guide, the mode of fixing the packing-disk and the connection between the latter with a water-cushion, which renders this arrangement so much more advantageous that by means of these improvements an absolute tightness is obtained, in consequence whereof the waste of water taking place with the various valves hitherto constructed is entirely obviated.

The accompanying drawing shows one method of carrying this invention into effect.

The body of the valve, which is connected with the bell or tank $a$ forming the water-closing means, can be raised by the aid of the lever $b$, and has a double guide consisting of the crown $c$ forming the body proper of the valve, on the one hand, and of the box or shell $d$, screwed into the said crown, on the other hand. This box is provided with an outer flange $e$, between which and the crown $c$ the packing-disk or washer $f$, of india-rubber or of any other suitable material, is locked by screwing $c$ and $d$ together. The valve-seat consists of the box or shell $g$, which is let into the central bottom opening of the tank and firmly screwed thereto by means of the nut $h$. The material which connects the upper and wider part and the lower and narrower part of the box $g$ is turned so as to form on the surface a small circular rib $i$ and is bored or hollowed out deeply inside the same so that a water-cushion $k$ is formed between the lower part of the box $g$ and the packing-disk $f$, the latter of which is firmly pressed against the rib $i$ when the valve is closed—that is to say, against the flange $e$. The upper parts of the box $g$ and the box $d$ are provided with slots through which when the valve is raised the water can flow downward from the tank. The body of the valve has likewise a double guide which prevents the same from striking the valve-seat obliquely and from springing out of position. The water-cushion $k$ is provided so as to allow sufficient play when the disk $f$ is being tightened to form a more perfect joint, as well as to increase the elasticity of the same. The conduit $l$ is provided for the flushing-water, which is opened and closed by a cock actuated by a suitable ball valve or float, as is usual in the generality of water-tanks.

What I claim, and desire to secure by Letters Patent of the United States, is—

1. The combination with the tank provided with a valve seat having an annular recess, and separate guiding portions in different horizontal and vertical planes, of the valve having portions of different diameters for engaging said guiding portions, and having a shoulder adapted to register with the valve seat, connecting said portions of different diameters, a packing ring engaging said shoulder, and a removable collar for clamping said packing ring upon said shoulder, said collar having a part for engaging the annular recess in said valve seat to form a water cushion therewith, substantially as described.

2. The combination with the tank provided with a horizontal valve seat, a vertical guiding portion above said seat and a guiding portion of less diameter below said seat, said seat having an annular rib, and an annular recess within said annular rib, of the valve having portions of different diameters for engaging said guiding portions, and a connecting shoulder, in line with said valve seat and annular rib, a packing ring engaging said shoulder and a removable collar having a part engaging said packing ring to hold it upon said shoulder, and parts engaging said annular recess to form therewith a water chamber, substantially as described.

In witness whereof I have hereunto set my hand in presence of two witnesses.

MARTIN HEINRICH WILHELM HERMANN.

Witnesses:
H. LABHART,
F. RENNER.